United States Patent [19]

Pakos

[11] Patent Number: 5,221,234
[45] Date of Patent: Jun. 22, 1993

[54] METHOD AND APPARATUS FOR MAKING A SCREW HAVING VARIABLY CANTED THREADS

[76] Inventor: Andrew Pakos, 492 Edward St., Latrobe, Pa. 15650

[21] Appl. No.: 824,671

[22] Filed: Jan. 23, 1992

[51] Int. Cl.[5] .............................. B21H 3/02; B23B 1/00
[52] U.S. Cl. ...................................... 470/10; 470/66; 82/110; 82/11.1; 82/17
[58] Field of Search ...................... 470/10, 9, 8, 58, 66, 470/72, 71, 70, 81; 82/110, 111, 11.1, 12, 11.2, 17

[56] References Cited

U.S. PATENT DOCUMENTS

| | | | |
|---|---|---|---|
| 1,470,683 | 10/1923 | Boehm | 470/71 |
| 1,648,319 | 1/1929 | Quedens | 82/17 |
| 1,795,594 | 3/1931 | Class | 82/17 |
| 2,184,377 | 12/1939 | Bickel | 82/17 |
| 2,502,268 | 3/1950 | Moss | 82/110 |
| 2,722,151 | 11/1955 | Layton et al. | 82/17 |
| 2,754,711 | 7/1956 | Shapiro et al. | 82/110 |
| 3,120,141 | 2/1964 | Keichel | 82/17 |
| 3,145,599 | 8/1964 | Doran | 82/11.1 |
| 3,445,498 | 2/1970 | Prutton | 82/11.1 |
| 3,630,110 | 12/1971 | Jeanneret | 82/11.1 |

Primary Examiner—Lowell A. Larson
Assistant Examiner—Michael J. McKeon
Attorney, Agent, or Firm—Barry I. Friedman

[57] ABSTRACT

A cutting device and method for its operation are utilized to apply variably canted threads to a screw blank. A conventional cutting lathe is provided with a conventional hydraulically operated adjustable cutting support attached thereto. A guide plate is generally mounted upon the lathe adjacent the armature, which is guided therealong to produce a particular pattern in the workpiece. The armature is pivotable to permit cutting at particular angles into the surface of a workpiece. A secondary guide is utilized in producing a controlled variable pivot of the cutting armature during its progression along the body of the workpiece. The secondary guide is rigidly mounted to the adjustable cutting armature and precisely controls its movement during the cutting operation, producing a cutting operation having dual movement characteristics. The cutting armature is moved longitudinally along the axis of the workpiece which simultaneously rotating about its pivot point to create a change in cutting angle over the length of this screw blank body. In order to produce the variably canted threads on a screw body having a tapered core, a preliminary cutting operation is first performed on the screw blank according to the traditional operation of the adjustable cutting support in which the cutting depth of the armature is changed over the course of the cutting operation. This preliminary cutting step permits the combination of the tapered core of the screw body and the variably canted threads.

30 Claims, 5 Drawing Sheets

METHOD AND APPARATUS FOR MAKING A SCREW HAVING VARIABLY CANTED THREADS

BACKGROUND OF THE INVENTION

1. Field of the Invention

The present invention relates to a method and apparatus for applying screw threads to a screw blank, the threads having a unique orientation. More specifically, the invention is directed to a device and method of cutting threads into a screw wherein the threads increase in cutting angle from the point to the top of the screw body. Furthermore, the screw core increases in diameter over the same length.

2. Description of the Prior Art

Screws have been utilized for a considerable period of time for the fastening of various objects to each other. Screws are particularly utilized for creating a joinder between two materials through the use of cutting threads which securely mount the shaft of the screw into a mounting substrate. Traditional screw threads cut a helical path through the substrate in an even and parallel form in order to maximize the binding characteristic of the screw while creating as little damage as possible to the substrate when the screw is inserted. While most screws are regular in the orientation of their threads and the sizing thereof, several screws have been developed which enjoy unique and irregular screw thread and core patterns.

A number of screws have been proposed which utilize a tapered central core in which the core of the screw and possibly the threads attached thereto has a smaller overall diameter at the point of the screw than at the head of the screw. This cone-shaped object is utilized for piercing and self-threading applications in which the screw is driven directly into a substrate without the need for a pilot hole or other starting techniques.

One shortcoming of screws having equally spaced and parallel threads is that the screw develops no compressive force on the substrate. While this is generally beneficial when utilized with a fragile substrate or an application in which the members to be joined are correctly oriented prior to insertion of the screw, in some applications it would be advantageous to develop a compressive force on the substrate exerted by the screw. This has been achieved in Lasner, a co-pending application, entitled "BONE SCREW WITH IMPROVED THREADS", bearing Ser. No. 07/618,500, filed Nov. 27, 1990, now U.S. Pat. No. 5,120,171. In this reference, a screw having threads which are progressively canted over the length of the screw is disclosed. The screw utilizes a tapered central core which is narrower at the point end and wider at the head end. The screw threads are angled at the point end in a fashion roughly perpendicular to the longitudinal axis of the screw core. As the threads progress along the screw core from the point end to the head end, the angle of the threads gradually increases from the nearly perpendicular with respect to the core surface to form a series of increasing obtuse angles with respect thereto. This screw develops a compressive force on the substrate material as it is inserted as the increasing cant of the threads over the length of the screw develops an increasing force on the substrate as they enter into it. An increasing continuum of compressive force is therefore developed along the longitudinal axis of the screw with the least amount of compressive force being present at the point end and the most compressive force being present at the head end. The reference does not, however, describe a method or apparatus for creating such threads on a traditional screw blank.

Screws may generally be manufactured in one of two ways. The first is to create a mold and cast a screw in the shape of the mold. The second is to begin with a screw blank and cut the threads into the blank utilizing a lathe or similar device. Even with the cast embodiment, an original prototype must be utilized to create the mold and no method or apparatus has been previously described which is capable of creating progressively canted threads along a screw body. Furthermore, while cutting devices have been proposed which permit the cutting of a tapered screw core with or without tapered threads thereon, no method or apparatus has been proposed which achieves the manufacturer of a screw having a tapered core and threads of varying cant.

What is lacking in the art, therefore, is a cutting device which is capable of variably cutting screw threads into a screw blank and which may further apply such threads to a screw blank having a tapered core.

SUMMARY OF THE INVENTION

A cutting device and method for its operation are disclosed in which a two step process is utilized to apply variably canted threads to a screw blank. A conventional cutting lathe is modified according to the specification herein in order to achieve the desired result. The lathe is provided with a conventional hydraulically operated adjustable cutting support attached thereto. A typical lathe suitable for this operation is the Doall 13, model number 112M 590. The hydraulic cutting armature is also commercially available as the True Trace 2055A.

The adjustable cutting armature is traditionally utilized to cut variably surfaced shapes into a cylindrical workpiece while it is being rotated on the lathe. The armature is generally adjustable with respect to the workpiece in terms of both distance and angle of cutting attack. A guide plate is generally mounted upon the lathe adjacent the armature, which is guided therealong to produce a particular pattern. The pattern is provided to scale on the guide plate and the armature is abutted to the guide plate during operation. As the armature moves along the guide plate the pattern thereof is inscribed, to scale, into the workpiece.

The armature is pivotable to permit cutting at particular angles into the surface of a workpiece but is generally not pivoted during the cutting operation. A secondary guide has been developed and is utilized in producing a controlled variable pivot of a cutting head pivotably mounted on the cutting armature during its progression along the body of the workpiece. The secondary guide is rigidly mounted to the cutting head and precisely controls its movement during the cutting operation. This produces a cutting operation having dual movement characteristics. The cutting armature and cutting head are moved longitudinally along the axis of the workpiece and the cutting head is simultaneously rotated about its pivot point to create a change in cutting angle over the length of this screw blank body. It is this particular dual movement capability that permits the production of the variably canted threads.

In order to produce the variably canted threads on a screw body having a tapered core, a preliminary cutting operation is first performed on the screw blank according to the traditional operation of the adjustable cutting support in which the cutting depth of the armature is changed over the course of the cutting operation. While well known in the prior art, this preliminary cutting step permits the combination of the tapered core of the screw body and the variably canted threads.

These and other advantages and features of the present invention will be more fully understood with reference to the presently preferred embodiments thereof and to the appended drawings. BRIEF DESCRIPTION OF THE DRAWINGS

DESCRIPTION OF THE PREFERRED EMBODIMENTS

Figure 1:
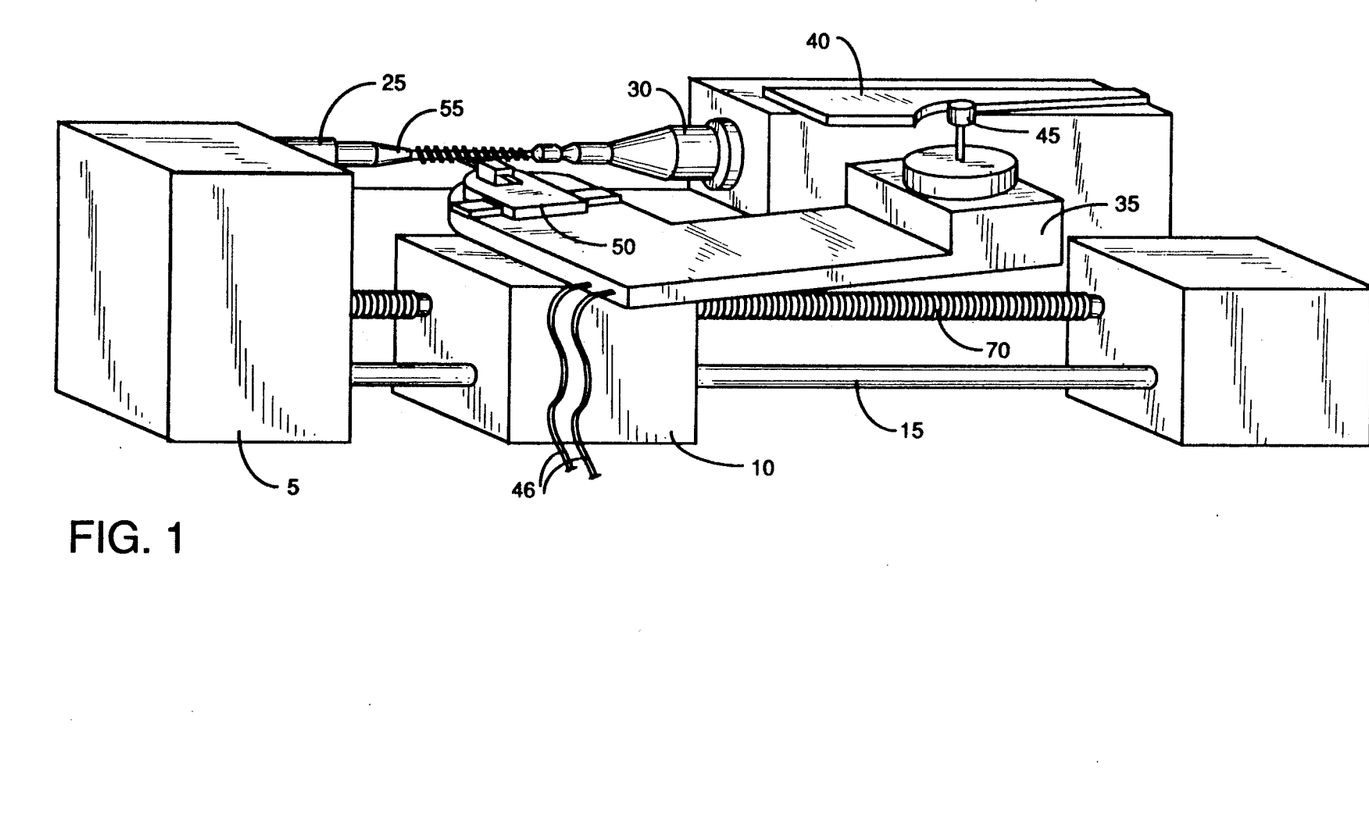
FIG. 1 is an isometric view of the assembled apparatus having a workpiece in place.

Referring now to FIG. 1, a lathe 5 is provided with a number of customized modifications. The lathe itself, however, is a standard model utilized for the turning of small objects. The lathe generally includes a number of electronic controls for setting the speed of cutting, time of rotation and other operating parameters which are not illustrated in the Figure nor will be described here. It is assumed that these features are generally well known to those skilled in the art and the description of their operation is unnecessary. In operation, the utilization of the lathe itself is through the utilization of common turning techniques and the operation of the machine is essentially unchanged. The lathe is generally provided with a movable carriage 10 supported upon a support rod 15 and a drive rod 20. The carriage 10 is adapted to be displaced longitudinally along support rod 15 which is generally cylindrical in cross-section to permit the sliding of the carriage therealong. The drive rod 20 is a threaded rod which threadably engages the carriage 10 and is utilized to displace the carriage 10 longitudinally with respect to the work piece. The drive rod 20 is motorized in a conventional manner and is controllably turned through the operation of the lathe 5. As the threaded drive rod 20 rotates, the carriage 10 is controllably displaced through the operation of the threads.

Mounted upon the carriage 10 is an adjustable cutting armature which is also a commercially available item. The adjustable cutting armature 35 is hydraulically operated and is fed through hydraulic lines 46 from a pumping mechanism which is not displayed in the Figure.

The adjustable cutting armature 35 is utilized according to its intended purpose with the only modification thereto being the adaptation of a specialized cutting head which is mounted in an appropriate place on its top surface. In general, the operation of the adjustable cutting armature 35 is such that it is slidably mounted upon the carriage 10. The armature has an elongated portion upon which a traveler wheel 45 is mounted. The traveler wheel 45 engages an adjustable cutting guide 40 mounted upon the lathe. In operation, the adjustable cutting armature is position upon the carriage 10 with the cutting head 50 mounted thereon. The adjustable cutting guide 40 is mounted upon the lathe and the traveler wheel 45 is positioned adjacent thereto. As the carriage 10 travels along support rod 15 through the operation of drive rod 20, the traveler wheel 45 is moved along the edge surface of adjustable cutting guide 40. Adjustable cutting guide 40 has a pattern engraved along the edge thereof, which is to be replicated by the cutting head 50 on the workpiece. As the traveler wheel 45 moves along the pattern edge of adjustable cutting guide 40, the adjustable cutting armature is slidably displaced on carriage 10 and consequently adjusts the position of cutting head 50 relative to the workpiece, or screw 55 in this particular case. Adjustable cutting guide 40 is sized proportionally to correctly position the cutting head 50 on the smaller workpiece. In this way, an overall cutting pattern may be engraved upon the workpiece. In this particular embodiment, the adjustable cutting armature 35 is utilized to achieve the tapered central core on the screw workpiece as will be described more fully with reference to this specific cutting operation and FIG. 2.

The lathe 5 is provided with a left chuck 25 and a right chuck 30, as shown in FIG. 1, in order to support and rotate the workpiece, or screw 55 as shown in FIG. 1. The lathe and chuck mechanism operate in a conventional fashion with the chuck spinning at a desired velocity. The force to the chucks is provided through a conventional motoring gear system which is well known to those skilled in the art, and is included in the preassembled lathe device. The screw 55 is firmly clamped along the longitudinal axis of the chuck, such that it is rotated with a minimum amount of eccentricity.

Figure 2:
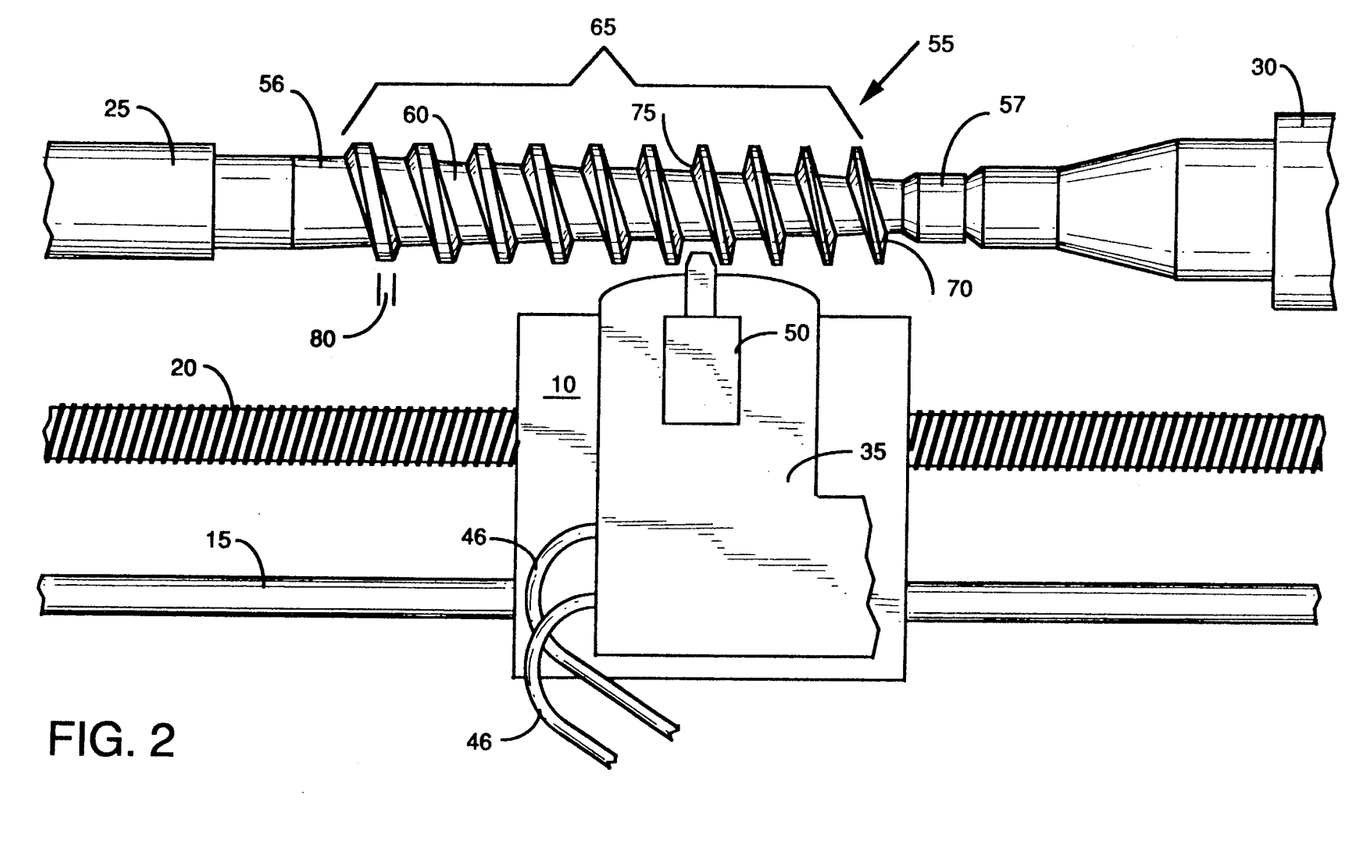
FIG. 2 is a top plan view of a portion of the apparatus showing a preliminary cutting operation.

Referring now to FIG. 2, a portion of the device is illustrated which is particularly directed to the orientation of the cutting head and the workpiece during a preliminary cutting operation. This preliminary cutting operation is generally according to the teachings of the prior art for production of a tapered screw core. As previously illustrated with reference to FIG. 1, the carriage 10 is mounted upon support rod 15 and drive rod 20 which is threaded t longitudinally displace carriage 10 with respect to the workpiece or screw 55 as particularly illustrated in FIG. 2. Carriage 10 has adjustable cutting armature 35 slidably mounted thereupon, although the sliding element is not displayed. Hydraulic lines 46 provide hydraulic power to the adjustable cutting armature 35 to control its relative motion. Cutting head 50 is rotatably affixed to adjustable cutting armature 35 and is positioned such that it abuts the screw 55 during the cutting operation. For the purposes of this preliminary operation, the cutting head 50 is rigidly fixed with respect to the adjustable cutting armature 35.

The screw 55 is mounted within the chucks 25 and 30 and is provided with head and tip bosses 56 and 57, respectively, for mounting within the chucks. The tip boss is later removed to create a pointed end while the head boss 56 becomes either a portion of the screw shaft or is removed to create the head of the screw. As illustrated in FIG. 2, the threads 65 of screw 55 have already been cut according to a preliminary cutting step which is optionally utilized to create a tapered screw core 60 having threads of varying thickness and a core of varying diameter. As can be seen in FIG. 2, the diameter of the screw core 60 is considerably smaller at the end adjacent tip boss 57 as that adjacent head boss 56. Consequently, the depth of the threads is larger at the tip end of the screw 55 but the threads themselves are thicker at the head end of the screw. Thread thickness 80 is therefore dependent upon the location of the thread along the longitudinal axis of the screw 55 and decreases in a uniform and linear relationship from end to end.

Each of the threads has a leading thread face 70 and a trailing thread face 75. For the purposes of this discussion, the leading thread face 70 shall be designated that facing the tip end of the screw 55 and the trailing thread face 75 shall be that facing the head end of the screw 55. As can be seen in FIG. 2, the leading thread faces of each thread are all parallel to each other as are the trailing thread faces while the distance between them for each thread revolution increases from tip to head.

This cutting operation is achieved through the use of the adjustable cutting armature 35 and adjustable cutting guide 40. With further references to both FIGS. 1 and 2, a triangular adjustable cutting guide 40 is utilized to produce this particular thread effect. The cutting operation is begun at the tip end of the screw blank and the traveler wheel 45 of the adjustable cutting armature 35 is at the lowest point of the triangularly shaped adjustable cutting guide 40. As the cutting operation commences and the carriage 10 and adjustable cutting armature 35 are displaced leftwardly, that is, from tip to head end of the screw 55 along support rod 15, the adjustable cutting armature 35 is withdrawn in a linear continuous fashion, perpendicular to its longitudinal displacement, to create a shallower cut in the screw 55 as the cutting operation proceeds. This is caused by the triangularly shaped adjustable cutting guide 40 upon which the traveler wheel 45 rests. As the traveler wheel 45 moves along the patterned edge of the adjustable cutting guide 40, it is forced outwardly by the triangular shape thereof. This force is translated to the cutting head 50 which mimics the triangular pattern of the adjustable cutting guide 40 in its cut into screw 55. The effect of this movement is illustrated in FIG. 2 in the tapered central core 60 of screw 55 and the widening thread thickness 80 as one proceeds from the tip end to the head end of the screw 55. It is to be specifically noted that this particular tapering preliminary step is optional and is utilized to produce the tapered cone embodiment of the screw. If a non-tapered screw were desired having the variably canted threads described previously, the preliminary step would be utilized with a straight adjustable cutting guide 40 rather than the triangular embodiment described previously.

Figure 3:
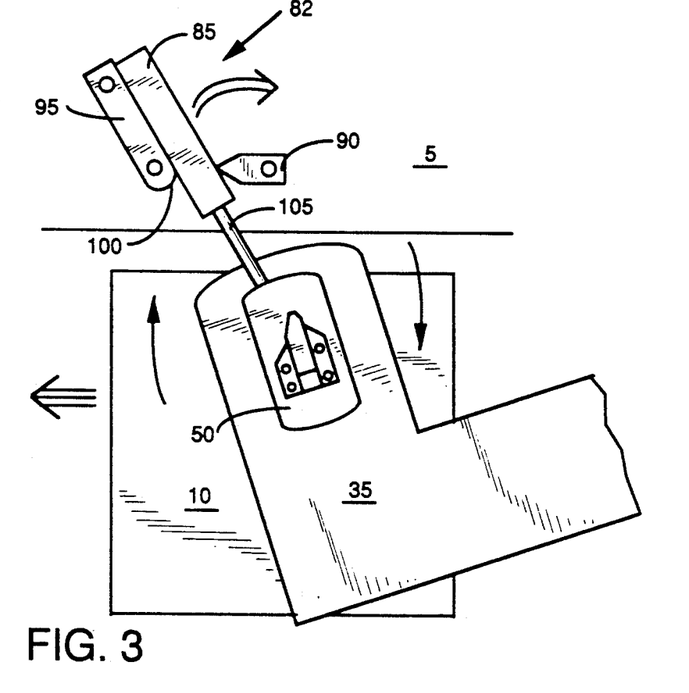
FIG. 3 is a top plan view of a portion of the apparatus displaying the secondary guide mechanism and the rotation of the adjustable cutting armature.

FIG. 3 illustrates the secondary guide 82 which produces the second movement characteristic of adjustable cutting armature 35 to produce the variably canted threads. As illustrated in FIG. 3, carriage 10 is again mounted with adjustable cutting armature 35 thereon. Adjustable cutting armature 35 is fixed for this operation on carriage 10. Secondary guide 82 is utilized, however, to create a secondary rotational pivoting motion of cutting head 50 simultaneous to the longitudinal displacement of the carriage 10 and cutting head 50 during the cutting operation with respect to the workpiece. This is achieved through the combination of several elements which provide a controlled pivoting motion. The lathe 5 is provided with a planar bulkhead area adjacent to the mounting of the workpiece and the traveling area of carriage 10. Upon this planar area, a pivot stop 95 and a pivot fulcrum 90 are permanently mounted. Inserted between the pivot stop 95 and pivot fulcrum 90 is a pivot bar 85 which is abutting both pivot stop 95 and pivot fulcrum 90. Pivot bar 85 is otherwise freely movable and is not affixed in any way to pivot stop 95, pivot fulcrum 90, or lathe 5. Pivot bar 85 is affixed to cutting head 50 through a connecting rod 105 which is rigid and permanently mounted to both pivot bar 85 and cutting head 50. A rotation surface 100 is provided at one end of pivot stop 95 to control the movement of pivot bar 85 during the cutting operation. Changes in the curvature of rotation surface 100 are utilized to adjust the beginning cutting angle, end cutting angle and rate of change between those parameters.

Figure 4:
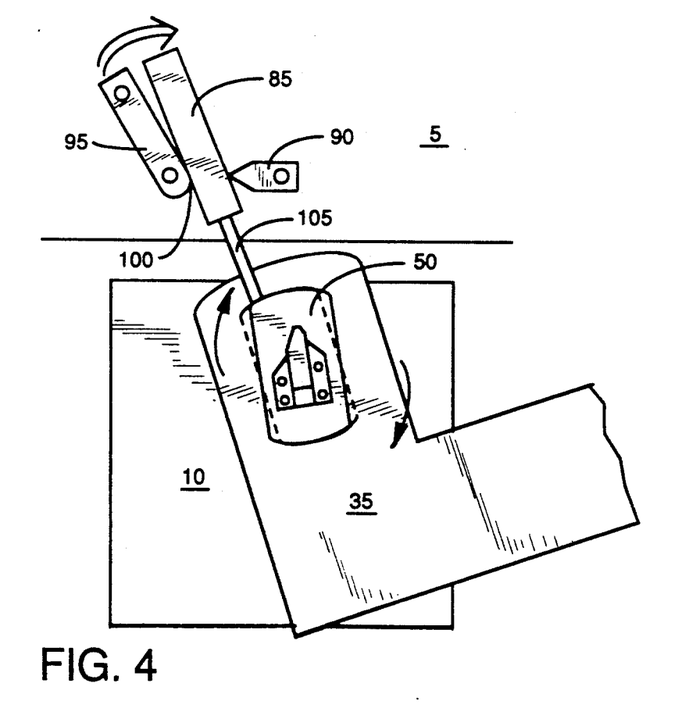
FIG. 4 is a top plan view of a portion of the apparatus illustrating the rotation of the adjustable cutting apparatus when compared with FIG. 3.

The operation of the secondary guide 82 is further illustrated with reference to both FIGS. 3 and 4. As shown in FIG. 3, carriage 10, during the cutting operation, is moved leftwardly according to the triple arrow in order to achieve a two step cutting operation of the screw 55 (not shown). In a conventional cutting operation, as with the preliminary operation described with reference to FIG. 2, the cutting head 50 would be oriented perpendicularly to the longitudinal axis of the screw in order to achieve a regular parallel threaded surface. The purpose of secondary guide 82 is to pivotably rotate cutting head 50 with relation to adjustable cutting armature 35 during the longitudinal displacement of carriage 10 according to the triple arrow. This rotational movement is indicated by the single arrows in FIG. 3. As carriage 10 and cutting head 50 are displaced leftwardly according to the triple arrow, pivot rod 85 is urged against pivot stop 95 because of the rigid connection of connecting rod 105 between cutting head 50 and pivot bar 85. Pivot bar 85 is further restrained by pivot fulcrum 90 such that as it is urged against pivot stop 95, it is forced into a circular rotational motion as illustrated by the double arrow of FIG. 3. As carriage 10 and cutting head 50 move leftwardly according to the triple arrow, pivot bar 85 is rotated rightwardly in a circular manner according to the double arrow. Pivot bar 85 is rotated along rotation surface 100 because of the presence of pivot fulcrum 90, as shown in FIGS. 3 and 4. As shown in FIG. 4, the double arrow indicates the rotation of pivot bar 85 away from pivot stop 95 and around the curved rotational surface 100. The curvature characteristics of rotation surface 100 are therefore utilized to determine the rate of change of rotation of adjustable cutting armature 35 and head 50. A more gently rounded rotation surface 100 will cause a more gradual rotation of adjustable cutting armature 35, while a sharp drop off in rotation surface 100 will cause a rapid rotation of cutting armature 35. This rotation is further illustrated in FIG. 4 which indicates the rotation of cutting head 50 on adjustable cutting armature 35 through single arrows and the change in position thereof with respect to FIG. 3 through the use of a chain line. It should be specifically noted that at all times pivot bar 85 is restrained from movement away from its abutting position with respect to pivot stop 95 by pivot fulcrum 90. In this way, a controlled rotational motion of cutting head 50 is achieved which is directly attributable to and proportional with the movement of carriage 10 in along the longitudinal axis of the screw. The effect of this dual characteristic motion will be further explained with reference to FIG. 6.

Figure 5:
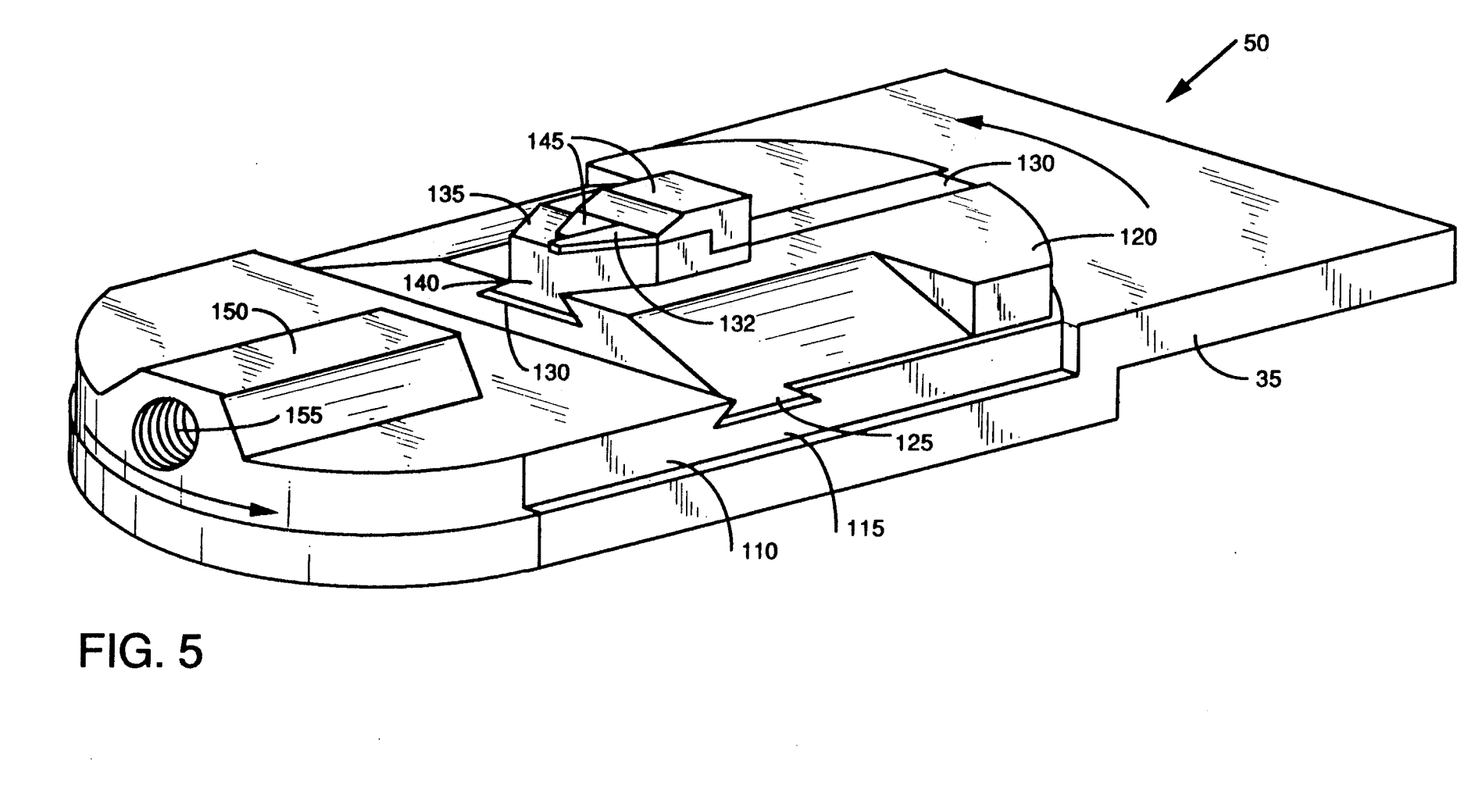
FIG. 5 is an isometric view of the cutting head of the apparatus.

Refering now to FIG. 5, cutting head 50 is shown as pivotably mounted to adjustable cutting armature 35. A connecting rod mounting hole 155 is provided to engage and restrain connecting rod 105, as illustrated in FIGS. 3 and 4. Cutting head 50 is comprised of a rotational cutting head base 110, cutting head adapter 120, slidably mounted on said rotational cutting head base 110 and adjustable in a first dimension with in cutting base slot 115, cutting insert support 135, where is slidably mounted on said cutting head adapter 120 and adjustable in a second dimension within cutting head adapter slot 130, cutting insert 132, and cutting insert support locking means 145 for firmly affixing the cutting insert 132 to the cutting insert support 135. Cutting head base slot 115 and cutting head adapter slot 130 are generally perpendicular to each other, permitting relative movement of cutting the cutting insert 132 in two dimensions.

Figure 6:
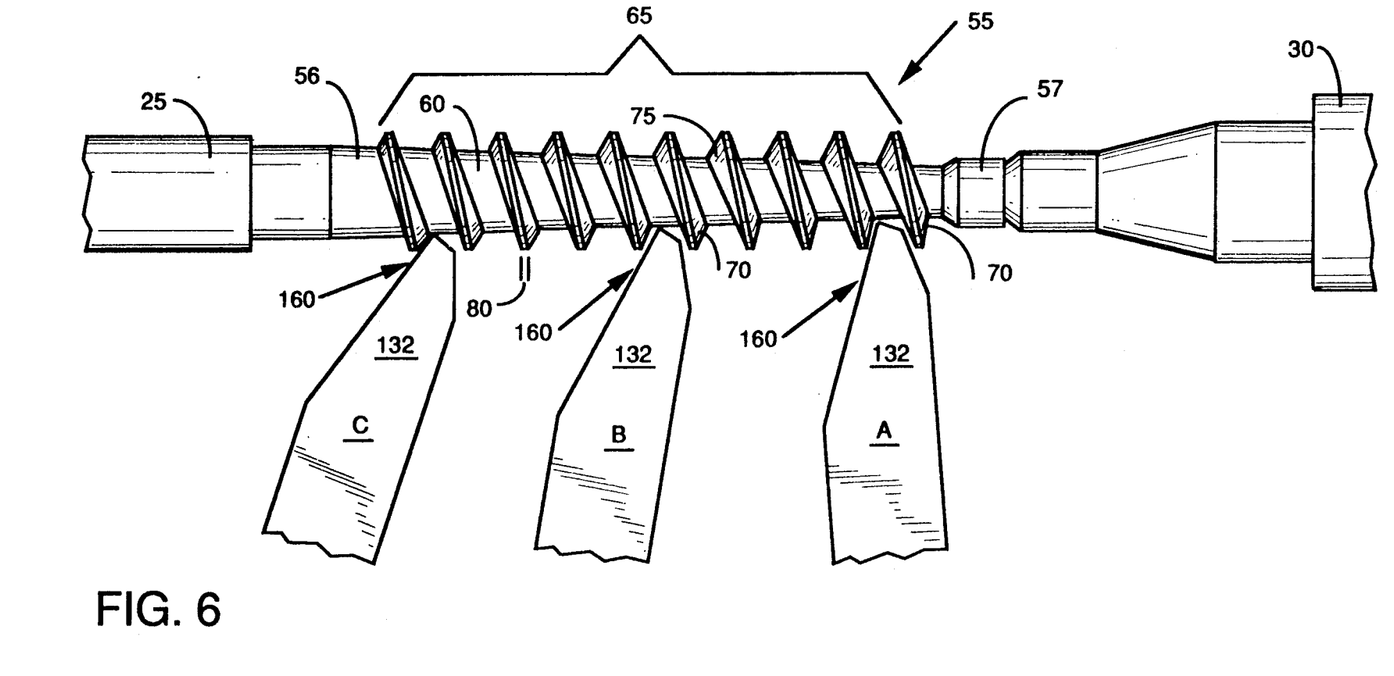
FIG. 6 is a top plan view of the workpiece undergoing the cutting operation producing the variably canted threads.

Referring now to FIG. 6, the screw 55 is illustrated following the second cut, producing the variably canted threads 65. The screw 55 is again mounted within the chucks 25 and 30 by the respective bosses 56 and 57. The screw 55 has first been cut according to the previous description with reference to FIG. 2. If the device has been adapted according to the previous description, the screw 55 need not be removed from the chucks between cutting operations. The cutting head 50 is released from its fixed position, and the adjustable cutting armature 35 is fixed if the non-tapered embodiment is to be produced. If a tapered screw core 60 is to be produced, then the triangular adjustable cutting guide 40 is again utilized so that the adjustable cutting armature will follow the same cutting pattern during the second cut as the first.

The cutting insert 132 is placed adjacent the leading face 70 of the first thread nearest the tip boss 57. The carriage 10 is moved longitudinally from the tip end of the screw to the head end. As previously described, the cutting insert 132, mounted in cutting head 50, is rotated as well as displaced longitudinally by the secondary guide 82. This causes the cutting insert to change its orientation with relation to the longitudinal axis of the screw 55 during the cutting operation. At point A, as shown in FIG. 6, the cutting insert 132, which has been exaggerated in the Figure for clarity, is positioned nearly identically to its starting, or first position. As the carriage 10 and cutting insert 132 move longitudinally along the length of the screw 55, the cutting insert is rotated through positions B and C, as illustrated in FIG. 6. This change of cutting angle of cutting insert 132 causes a change in the shape of the groove cut into the screw 55. The cant of each successive thread 65 with forms the walls of the groove is therefore continuously varied along the longitudinal axis of the screw 55. The rate of change of the angle of the cutting insert 132's attack on the screw 55 is adjusted through the curvature characteristics of rotation surface 100, as described with reference to FIGS. 3 and 4.

While a present preferred embodiment of the invention is described, it is to be distinctly understood that the invention is not limited thereto but may be otherwise embodied and practiced within the scope of the following claims.

What is claimed is:

1. An apparatus for inscribing a variably canted thread in a screw blank, comprising:
   a) a cutting device adapted to restrain and cut said screw blank, said cutting device having a longitudinally movable carriage mounted adjacent said screw blank;
   b) an adjustable cutting armature mounted upon said carriage, the position of said armature being variable with relation to said screw blank according to a first guide during the inscribing operation;
   c) a cutting head pivotably mounted upon said adjustable cutting armature, said cutting head adapted to inscribe a groove in said screw blank, forming threads; and
   d) secondary guide means, affixed to said cutting head, adapted to rotatably vary the position of said cutting head with relation to said screw blank during the inscribing operation, said variation of said cutting head causing an angular variation in said groove and said threads.

2. An apparatus as described in claim 1, wherein said cutting device is a lathe and is adapted to rotatably mount said screw blank in a fixed location having a longitudinal axis and said movable carriage is mounted adjacent said screw blank and is displaced parallel to said longitudinal axis of said screw blank.

3. An apparatus as described in claim 1, wherein said adjustable cutting armature is movably mounted upon said carriage, said adjustable cutting armature being displaced with relation to said screw blank during movement of said carriage by abutment of a portion thereof against a guide surface, said adjustable cutting armature adapted to mimic a pattern provided in said guide surface.

4. An apparatus as described in claim 3, wherein said displacement of said adjustable cutting armature being perpendicular to the movement of said carriage.

5. An apparatus as described in claim 4, wherein said first guide is adapted to provide a gradual displacement of said adjustable cutting armature with respect to the longitudinal movement of said carriage.

6. An apparatus as described in claim 5, wherein said gradual displacement of said adjustable cutting armature produces a tapered screw core when the screw blank is inscribed.

7. An apparatus as described in claim 1, wherein said cutting head is pivotably mounted to said adjustable cutting armature and rigidly mounted to said secondary guide means.

8. An apparatus as described in claim 7, wherein said cutting head is rigidly mounted to said secondary guide means by a connecting rod.

9. An apparatus as described in claim 8, wherein said cutting head is further comprised of a rotational base; a cutting head adapter, slidably mounted on said rotational base and adjustable in a first dimension; a cutting insert support, slidably mounted on said cutting head adapter and adjustable in a second dimension; a cutting insert for inscribing said groove in said screw blank; and locking means for firmly affixing said cutting insert to said cutting insert support.

10. An apparatus as described in claim 9, wherein said first dimension and said second dimension are perpendicular.

11. An apparatus as described in claim 7, wherein said cutting head is displaced longitudinally with respect to said screw blank when said carriage is similarly displaced and said cutting head is simultaneously displaced rotationally as said longitudinal movement urges said cutting head against said secondary guide means.

12. An apparatus as described in claim 1, wherein said secondary guide means is further comprised of a pivot stop rigidly mounted to said cutting device; a pivot fulcrum rigidly mounted to said cutting device at a position adjacent and spaced apart from said pivot stop; and a pivot bar, positioned between said pivot stop and said pivot fulcrum, said pivot bar freely pivotable therebetween and against said pivot fulcrum.

13. An apparatus as described in claim 12, wherein said pivot stop provides a resting start position for said pivot bar.

14. An apparatus as described in claim 12, wherein said pivot stop further comprises a rotation surface at one end thereof, said rotation surface being immediately adjacent to and abutting said pivot bar.

15. An apparatus as described in claim 14, wherein said rotation surface has a particular angular characteristic, said angular characteristic regulating the rotational displacement of said cutting head.

16. An apparatus as described in claim 15, wherein said cutting head is displaced longitudinally with respect to said screw blank when said carriage is similarly displaced and said cutting head is rigidly affixed to said pivot bar, said cutting head being simultaneously displaced rotationally as said longitudinal movement thereof urges said cutting head, through said pivot bar against said rotation surface of said pivot stop.

17. An apparatus as described in claim 16, wherein said pivot bar is urged against said pivot stop by said movement of said cutting head and further urged into a rotational motion around said pivot fulcrum.

18. A method for inscribing a variably canted thread in a screw blank having a longitudinal axis mounted in a cutting device, the method comprising:
   a) positioning a cutting tool having a cutting surface adjacent said screw blank, said cutting surface adapted to move longitudinally along the surface of said screw blank;
   b) performing a first cut utilizing said cutting tool to produce a preliminary thread pattern while rotating one of said screw blank and said cutting surface with respect to the other;
   c) positioning a cutting tool having a cutting surface adjacent said screw blank, said cutting surface initially having a first orientation with respect to said longitudinal axis of said screw blank, said cutting tool adapted to move longitudinally along the surface of said screw blank and be simultaneously angularly displaced from said first orientation with respect to said longitudinal axis of said screw blank; and
   d) performing a second cut, such that said cutting surface creates a continuously variably shaped groove in said screw blank during the longitudinal and angular movement of said cutting tool adjacent said screw blank, forming a variably canted thread while rotating one of said screw blank and said cutting surface with respect to the other.

19. A method as described in claim 18, wherein said first cut is of uniform depth during its entirely.

20. A method as described in claim 18, wherein said first cut decreases in depth during the cutting action.

21. A method as described in claim 20, wherein said angular displacement of said cutting surface is rotational.

22. A method as described in claim 21, wherein said angular displacement of said cutting surface is guided by a secondary guide means, and wherein said method further comprises the step of adjusting said secondary guide means to alter the speed and manner of said displacement.

23. A guide for use in the production of a variably canted thread in a screw blank having a longitudinal axis, said guide adapted to rotatably vary the position of a cutting head with relation to said screw blank during an inscribing operation which forms a thread and thread groove, said variation of said cutting head causing an angular variation in said groove and said threads with respect to said longitudinal axis of said screw blank.

24. An apparatus as described in claim 23, wherein said guide is further comprised of a pivot stop; a pivot fulcrum rigidly mounted at a position adjacent and spaced apart from said pivot stop; and a pivot bar, positioned between said pivot stop and said pivot fulcrum, said pivot bar freely pivotable therebetween and against said pivot fulcrum.

25. An apparatus as described in claim 24, wherein said pivot stop provides a resting start position for said pivot bar.

26. An apparatus as described in claim 24, wherein said pivot stop further comprises a rotation surface at one end thereof, said rotation surface being immediately adjacent to and abutting said pivot bar.

27. An apparatus as described in claim 26, wherein said rotation surface has a particular preselected angular characteristic, said angular characteristic regulating the rotational displacement of said cutting head.

28. An apparatus as described in claim 27, wherein said cutting head is displaced longitudinally with respect to said screw blank and said cutting head is rigidly affixed to said pivot bar, said cutting head being simultaneously displaced rotationally as said longitudinal movement thereof urges said cutting head, through said pivot bar, against said rotation surface of said pivot stop.

29. An apparatus as described in claim 28, wherein said pivot bar is urged against said pivot stop by said movement of said cutting head and further urged into a rotational motion around said pivot fulcrum.

30. An apparatus as described in claim 23, wherein said cutting head is rigidly mounted to said guide by a connecting rod.

* * * * *

UNITED STATES PATENT AND TRADEMARK OFFICE
CERTIFICATE OF CORRECTION

PATENT NO. : 5,221,234
DATED : June 22, 1993
INVENTOR(S) : Andrew Pakos

It is certified that error appears in the above-identified patent and that said Letters Patent is hereby corrected as shown below:

In the abstract:

Line 18, delete "which" and insert -- while --.

Column 4, line 5, delete "position" and insert -- positioned --.

Column 4, line 48, "t" should be -- to --.

Column 7, line 8, "with in" should be -- within --.

Column 7, line 9, "where" should be -- which --.

Column 7, line 52, delete "with" and insert -- which --.

In the claims:

Column 8, line 32, delete "being" and insert -- is --.

UNITED STATES PATENT AND TRADEMARK OFFICE
CERTIFICATE OF CORRECTION

PATENT NO. : 5,221,234
DATED : June 22, 1993
INVENTOR(S) : Andrew Pakos

It is certified that error appears in the above-indentified patent and that said Letters Patent is hereby corrected as shown below:

Column 10, line 4, delete "entirely" and insert -- entirety --.

Signed and Sealed this

Third Day of May, 1994

*Attest:*

BRUCE LEHMAN

*Attesting Officer*   *Commissioner of Patents and Trademarks*